(12) United States Patent
Deco et al.

(10) Patent No.: US 8,423,490 B2
(45) Date of Patent: Apr. 16, 2013

(54) METHOD FOR COMPUTER-AIDED LEARNING OF A NEURAL NETWORK AND NEURAL NETWORK

(75) Inventors: Gustavo Deco, Vilassar de Mar (ES); Martin Stetter, München (DE); Miruna Szabo, Ottobrunn (DE)

(73) Assignee: Siemens Aktiengesellschaft, München (DE)

( * ) Notice: Subject to any disclaimer, the term of this patent is extended or adjusted under 35 U.S.C. 154(b) by 896 days.

(21) Appl. No.: 11/992,785

(22) PCT Filed: Sep. 20, 2006

(86) PCT No.: PCT/EP2006/066523
§ 371 (c)(1),
(2), (4) Date: Sep. 2, 2009

(87) PCT Pub. No.: WO2007/036465
PCT Pub. Date: Apr. 5, 2007

(65) Prior Publication Data
US 2010/0088263 A1     Apr. 8, 2010

(30) Foreign Application Priority Data
Sep. 29, 2005 (DE) .......................... 10 2005 046 747

(51) Int. Cl.
*G06F 15/18* (2006.01)
*G06N 3/08* (2006.01)
(52) U.S. Cl.
USPC ........................................................ 706/25
(58) Field of Classification Search ............... 706/25–43
See application file for complete search history.

(56) References Cited

U.S. PATENT DOCUMENTS
2005/0246298 A1* 11/2005 Almeida et al. ................. 706/16

FOREIGN PATENT DOCUMENTS
DE     2004 013 924 B3     9/2005
EP     0 495 901 B1        7/1992
WO     WO 03/054794 A2     7/2003

OTHER PUBLICATIONS

Sigala, Natasha et al.; "Visual categorization shapes feature selectivity in the primate temporal cortex"; 2002; Macmillan Magazines Ltd.; Nature, vol. 415, 17; pp. 318-320.*

(Continued)

*Primary Examiner* — Jeffrey A Gaffin
*Assistant Examiner* — Stanley K Hill (57) ABSTRACT

There is described a method for computer-aided learning of a neural network, with a plurality of neurons in which the neurons of the neural network are divided into at least two layers, comprising a first layer and a second layer crosslinked with the first layer. In the first layer input information is respectively represented by one or more characteristic values from one or several characteristics, wherein every characteristic value comprises one or more neurons of the first layer. A plurality of categories is stored in the second layer, wherein every category comprises one or more neurons of the second layer. For one or several pieces of input information, respectively at least one category in the second layer is assigned to the characteristic values of the input information in the first layer. Input information is entered into the first layer and subsequently at least one state variable of the neural network is determined and compared to the at least one category of this input information assigned in a preceding step. The crosslinking between the first and second layer is changed depending on the comparison result from a preceding step.

20 Claims, 7 Drawing Sheets

OTHER PUBLICATIONS

Kitts, James A. et al.; "Structural Learning: Attraction and Conformity in Task-Oriented Groups"; 1999; Kluwer Academic Publishers; Computational & Mathematical Organization Theory 5:2; pp. 129-145.*

H. Bartsch et al., "On the Influence of Threshold Variability in a Mean-Field Model of the Visual Cortex"; Lecture Notes on artificial Intelligence (LNAI); Nr. 2036; 2001; pp. 174-187; XP002453918; Springer Verlag, Berlin Heidelberg.

Rita Almeida et al., "Modular biased-competition and cooperation:a candidate machanism for selective working memory"; European Journal of neuroscience; Nov. 2004; pp. 2789-2803, ; vol. 20; Nr. 10, XP002453917.

Miruna Szabo, "Learning to attend—Modeling the shaping of selectivity in infero-temporal cortex in a categorization task", Published online: Mar. 2006; pp. 1-15, Springer Verlag. http://neural.iss.infn.it/Papers/SzaboPap.pdf.

M. Szabo et al. "A model for the shaping of feature selectivity in IT by visual categorization". Neurocomputing; Jun. 2005; pp. 195-201; vol. 65-66, Elsevier Science Publishers; Amsterdam; NL; XP004889477, ISSN:0925-2312.

M. Szabo et al., "Cooperation and biased competition model can explain attentional filtering in the prefrontal cortex"; European Journal of Neuroscience; 2004; pp. 1969-1977; vol. 19; Nr. 6; Oxford Univeriity Press, GB; XP008069137 ISSN: 0953-816X.

* cited by examiner

METHOD FOR COMPUTER-AIDED LEARNING OF A NEURAL NETWORK AND NEURAL NETWORK

CROSS REFERENCE TO RELATED APPLICATIONS

This application is the US National Stage of International Application No. PCT/EP2006/066523, filed Sep. 20, 2006 and claims the benefit thereof. The International Application claims the benefits of German application No. 10 2005 046 747.4 DE filed Sep. 29, 2005, both of the applications are incorporated by reference herein in their entirety.

FIELD OF INVENTION

The invention relates to the dynamic selection of information. Systems of data processing, in particular intelligent agents or systems for the evaluation of data, receive input information. For this, the system has to process the input information according to certain criteria and emit it or derive and execute an action from the input information. The processing of the input information with regard to a task to be solved has particular importance here. Thus, numerous classification methods exist so as to assign input information to particular classes. It is hereby the objective to obtain a representation of the input information for the task to be solved which is as optimal as possible.

BACKGROUND OF INVENTION

Fields of application of classification methods in the medical area are related to the division of patients into groups with different diagnoses and drug tolerances. Another application is, for example, traffic engineering, in which sensor measurements are classified into different categories. Classification methods are further used in industrial automation, so as to classify for example product quality to be expected based on sensor values of the industrial process.

Numerous mathematic classification methods are known for processing input information, e.g. automatic learning methods with so-called "Support Vector Machines". Here, characteristics are first extracted from the input information, which can respectively occur in a certain characteristics value. A certain property of the input information is to be understood as a characteristic. Characteristic value is to be understood as whether, to what extent, or in which manner a certain characteristic is entered into the input information. The value can hereby give only the presence or the non-presence of a characteristic, but the value can also describe arbitrary intermediate steps. In the area of voice processing, a characteristic could for example indicate if information was cut (clipping) or not during the digitalization of an acoustic voice signal. In the area of image processing, a characteristic could indicate a grey tone distribution of pixels of an image. The value can hereby indicate e.g. for every one of 256 grey scale values, how often it occurs. Further characteristics could be the sound volume of a voice signal, the volatility of a share price, the speed of a vehicle, the unevenness of a surface, and the structures of an X-ray image. The examples given show that the extraction of characteristics is used in diverse areas of data processing.

Within the scope of the known mathematical methods, a classification of the extracting characteristics takes place after the extraction of different characteristics of the input information. If edges in an image are extracted as characteristics, it can be classified in a second step if the edges belong for example to the image of a face or a building. It is hereby disadvantageous that most methods cannot themselves decide which characteristics are important for the later classification and which are unimportant. Such a discrimination of characteristics in view of a task to be solved has then to take place by hand and has to be given to the system in any form. Finally, methods are also known which can choose characteristics selectively. However, the extraction of the characteristics or their value remains unaffected thereby.

From specification [1] is known a neural network which permits a selective representation of the value of characteristics of input information as a function of an attention filter. A characteristic is hereby the location of an object, which occurs in the values on the left and on the right; another characteristic is the type of the object, which occurs in the values "target object" and "other object". The representation of the values of these characteristics is selectively influenced by an attention filter.

By the representation of the values of the characteristics, it will be possible to strengthen, filter, mask, differentiate, emphasize, weight and evaluate certain characteristics or their value. This takes place by weighting the individual values of the characteristics in the representation. If, for example, a characteristic "grey value" only occurs in the values "black" and "white", a deep black input information can be represented by imparting a particularly high weight to the value "black" compared to other characteristics. In the specification [1], such a large weight of a value is represented by a pool of neurons with high activity.

It is however again disadvantageous here that the attention filter, that is, the information about the relevance of the individual characteristics, has to be fed by hand from the outside. Here, it is not possible to generate the neural network in an automated manner as a function of the relevance of the characteristics.

The document [Richard P. Lippmann: An Introduction to Computing with Neural Nets, IEEE ASSP MAGAZINE APRIL 1987, p. 4-22] relates to a general introduction into the calculation methods of neural networks. The use of neural networks for classifying patterns is also mentioned in the article. Nevertheless, a reward-based learning rule cannot be taken from this specification. In particular, the characteristic, that forwardly- and backwardly-directed weights are strengthened or weakened as a function thereof, if a correct categorizing of input information has taken place previously, is not shown in this document.

The specification [Michael Esslinger and Ingo Schaal: OCR mit SNNS, Mustererkennung mit neuronalen Netzen, Praktikumsbericht zum Vortrag Künstliche Intelligenz SS 2004 [OCR with SNNS, pattern recognition with neural networks, internship report for the presentation of artificial intelligence SS 2004] dated Feb. 7, 2004, 16 pages] also concerns the pattern recognition in neural networks. In the specification are also described several learning rules in paragraph 4, but where the adaptation of the weights does not take place in the manner as is established according to the invention. The specification [Siegfried Macho: Modelle des Lernens: Neuronale Netze, [Learning model: neural networks] Universitas Friburgensis, May 93, 6 pages] also relates to a general article regarding learning models with neural networks. In this article, the adaptation of associated connections is mentioned, but in this document there is also no indication of the special reward-based Hebb's learning method according to the invention.

SUMMARY OF INVENTION

It is an object of the invention to generate a method for learning a neural network which adapts the neural network in an automated manner to the relevance of the characteristic values and categories forming the basis of the network, and thereby imitates the learning process of creatures of a higher order.

This object is achieved by the independent claims. Further developments of the invention are defined in the dependent claims.

The method according to the invention generates a neural network, in which the neurons of the neural network are divided into at least two layers comprising a first layer and a second layer crosslinked to the first layer, wherein the crosslinking between the first and the second layers of the neural network is represented by synaptic connections between neurons and the strength of a connection is reflected by a weight. One thus reverts to known structures of neural networks, so as to implement the method according to the invention in a simple manner. The synaptic connections hereby comprise a forwardly-directed connection between a first to a second neuron and a backwardly-directed connection from the second to the first neuron.

In the first layer, input information is in each case represented by one or more characteristic values from one or several characteristics, in which every characteristic value comprises one or more neurons of the first layer, and a plurality of categories is stored in the second layer, wherein every category comprises one or more neurons of the second layer. In the method according to the invention, for one or several pieces of input information, respectively at least one category in the second layer is assigned to the characteristic values of the input information in the first layer. Finally, a piece of input information is entered into the first layer and subsequently at least one state variable of the neural network is determined and compared to the at least one assigned category of this input information, wherein it is determined during the performed comparison if a conformity is present for the input information between the at least one state variable of the neural network and the at least one assigned category of the input information. A simple criterion is created by this, so as to carry out a comparison between state variables of the neural network and assignments of categories to the characteristic values of the input information which can be carried out as fast as possible.

The activity of the neurons in the neural network is subsequently determined and the neurons are respectively classified as active or inactive depending on their activity. The activity of the neurons provides important information regarding the functionality of the neural network, and it is thereby advantageous to consider the activity of the neurons as parameters in the neural network.

According to the invention, the weights of the synaptic connections between active neurons of the first layer and active neurons of the second layer are strengthened, when a compliance is detected during the comparison of the state variables of the neural network for an input information with the assigned at least one category of the input information. The method is thus an advantageous modification of the Hebb's learning method known from the prior art, according to which connection strengths between active neurons are strengthened. The modification consists in that the strengthening only takes place when the state of the neural network indicates that the neural network provides a correct categorization.

Furthermore, according to the invention, when a compliance of the states of the neural network for input information with the assigned at least one category is present, the weights of the forwardly-directed synaptic connections from the first active neurons from one of the first and second layer to the second inactive neurons from the other one of the first and second layer are weakened. These synaptic connections indicate that a non-correct crosslinking is present between the neurons, so that a weakening of such connections is carried out so as to learn the network quickly and effectively.

In the reverse case, when no compliance is present between the state of the neural network and the assigned category of the input information, the weights of the synaptic connections between active neurons of the first layer and active neurons of the second layer are weakened according to the invention. Through this, the learning of wrong categories in the neural network is prevented in an effective manner. In the case that there is no compliance, the weights of all synaptic connections which are not weakened are preferably not changed.

With the method according to the invention, the crosslinking between neurons from a first and a second layer can correspondingly be adapted dynamically in a simple manner to the conditions of the underlying classification system. It is thus no longer necessary that the neural network is adapted by hand to the different characteristic values and corresponding categorizations.

In a preferred embodiment of the invention, the categories of the second layer describe solutions of a task, wherein the solution of the task depends on the input information. With such a method, the neural network can be adapted to different tasks in a simple manner.

In a particularly preferred embodiment of the method, it is achieved that the learnt network can distinguish characteristics according to their relevance in view of the given task. The characteristics are hereby divided into diagnostic characteristics, which are relevant for the solution of the task, and into non-diagnostic characteristics, which are not relevant for the solution of the task. Preferably, every at least one assigned category of input information represents a correct solution to the task. By this it is achieved in an advantageous manner that the given categorizing task is effectively solved with the neural network.

In a further particularly preferred embodiment of the invention, a compliance between a state variable of the neural network for an input information and the associated at least one category of the input information is present when the number of active neurons which belong to the associated at least one category of this input information exceeds a predetermined number as a function of the total number of neurons in the at least one category and/or the number of active neurons in other categories. The biological knowledge of neural networks will be used in an advantageous manner through this, according to which a strengthened activity of neurons indicates the presence of a certain category.

Preferably, when a compliance of the state of the network is present for input information with the associated category of the input information, no further changes of the synaptic connections are undertaken.

The method according to the invention is used as an iteration method in a particularly preferred embodiment, where the steps of the input of input information and subsequent comparison and the change of the crosslinking as a function of the comparison result is repeated several times. A particularly well-learnt neural network can be produced by a correspondingly frequent repetition of these steps. The iteration is preferably concluded after reaching a convergence criterion.

In a particularly preferred embodiment of the method according to the invention, a normalization of the crosslinking of the neural network is carried out after each iteration step, so as to ensure the convergence of the method.

In a further embodiment of the invention, the crosslinked neurons of the first and second layer of the neural network represent exciting pulsed neurons, which are conventionally used in neural networks. The exciting pulsed neurons of the first layer are hereby grouped at least partially into input pools, wherein at least one input pool is assigned to every characteristic value. By this, the speed of the method according to the invention is increased, as only the input pools have to be considered, and not all neurons individually with the calculations carried out.

The input pools preferably cooperate with one another and the activities of the input pools respectively represent a characteristic value. By this, the characteristic values are communicated directly with states of the input pools in a simple manner.

In a further preferred embodiment of the invention, the exciting pulsed neurons of the second layer are also grouped at least partially into category pools, wherein at least one category pool is assigned to every category. The speed of the method according to the invention is again increased hereby. However, in contrast to the input pools, the category pools preferably compete with one another, and an active category pool prevails in the competition. A category pool is hereby called active if it comprises at least a predetermined number of active neurons.

As is usual with conventional neural networks, the neural network also comprises inhibiting pulsed neurons in a preferred embodiment, which form at least one inhibiting pool in the first and/or second layer, wherein the inhibiting pool exerts a global inhibition on the input and/or category pools.

In addition to the method described above, the invention further relates to a neural network with a plurality of neurons, wherein the network is designed in such a manner that it is learnt with the method according to the invention. Such a learnt network has the advantage that it can be produced in an automated manner and can be adjusted effectively to the factors of a proposed categorization task.

BRIEF DESCRIPTION OF THE DRAWINGS

Exemplary embodiments of the invention are described in more detail in the following by means of the accompanying figures, in which.

DETAILED DESCRIPTION OF INVENTION

The embodiment of the method according to the invention described in the following is based on a neurophysiological experiment in a slightly changed form which is described in specification [2]. Hereby, the activity of neurons in the inferotemperal cortex (ITC) of awake monkeys was examined, who were given a visual categorizing task. How the ITC representation of the visual stimuli is influenced by the categorizing learnt by the monkeys was measured. The monkeys were taught to divide a set of images into two categories, where every category is in connection with the left or right position of a lever. The monkeys had to pull the lever into the corresponding direction, when a corresponding stimulus was shown.

Figure 1:
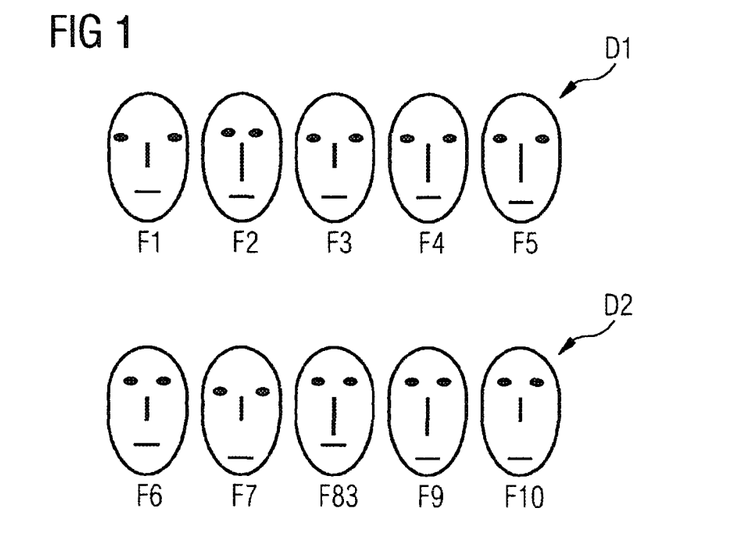
FIG. 1 shows a schematic representation of the categorization task used in one embodiment of the invention.

FIG. 1 shows a type of the experiment carried out, in which the monkeys had to divide ten schematized faces F1 to F10 into two categories. As results from the different faces, they are particularly distinguished in the height of the eye position, the length of the nose, and the height of the mouth position. Only one characteristic, namely the eye position, was relevant for the solution of the categorizing task. In FIG. 1, five faces F1 to F5 with the characteristic value D1 "low eye position" are shown, which have to be assigned to category C1 (corresponds to "lever to the left") according to the task. Further, five faces F6 to F10 with the characteristic value D2 "high eye position" are shown, which have to be assigned to category C2 (corresponds to "lever to the right") according to the task. The remaining characteristics, that is, the length of the nose and the position of the mouth are so-called non-diagnostic characteristics in the given categorizing task, which do not provide any information for the stimulus associated with the category and which have no relevance for the categorizing task.

After the monkeys were trained with the faces shown in FIG. 1 as stimuli, the learned animals were tested with test samples of faces. The animals had to carry out the categorizing task learnt. In these tests, the average activity of all visually reacting neurons was measured in the ITC cortex. For every neuron, the activity answers were sorted as a function of the characteristics of the presented stimulus, and were averaged over many experiments. As a result, average activities were obtained, from which results which characteristic values excite certain neurons most of all or least of all.

Figure 2:
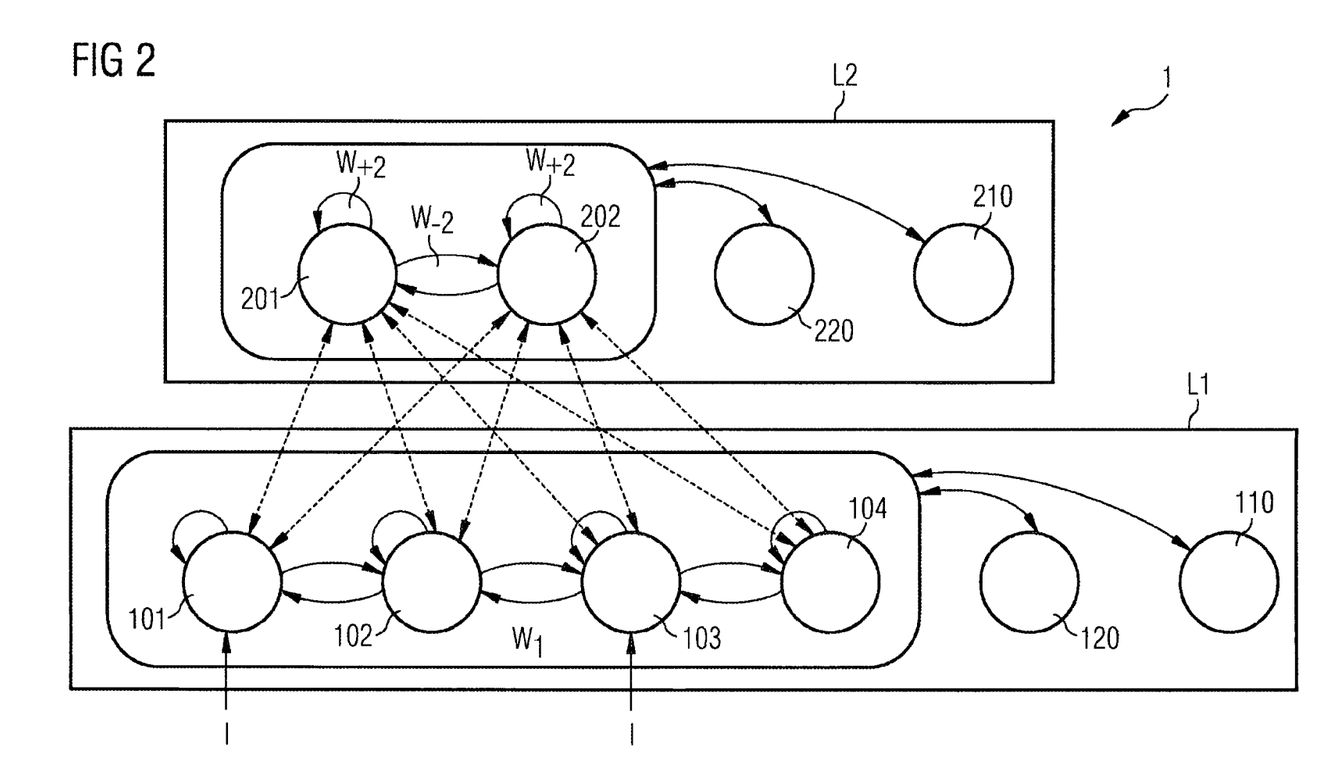
FIG. 2 shows a diagram which shows one embodiment of the neural network learnt with the method according to the invention.

Starting from the experiment described just now, a structure of a neural network which is adapted to the biological factors is given here in the described embodiment of the method according to the invention, which is suitable for the solution of the above categorizing task. This network structure is depicted in FIG. 2. It was hereby considered that two cerebric layers are relevant for the solution of categorizing tasks in the brain of creatures of higher order. The first layer L1 is the inferotemporal cortex already mentioned previously. With the categorizing task provided, four so-called input pools 101, 102, 103 and 104 form from specifically exciting pulsed neurons. A pool of neurons is hereby particularly distinguished in that all neurons in the pool comprise the same synaptic weights to the neurons of other pools. The first layer L1 is crosslinked with a second layer L2, which comprises a category pool 201 and a category pool 202 of exciting pulsed neurons and corresponds to the prefrontal cortex (PFC) in the brain. When the neurons 201 are active, the presence of category C1 is signaled by the network, and when the neurons 202 are active, the presence of category C2 is signaled by the network.

Every input pool is linked to corresponding characteristic values of the categorizing task, wherein the neurons are active in the corresponding input pools when a corresponding characteristic value is present at the stimulus presented. The input pool 101 represents hereby the characteristic value D2 "eyes at a high level", the pool 102 represents the characteristic value D1 "eyes at low level", the pool 103 concerns the characteristic N1 "long nose", and the pool 104 represents the characteristic N2 "short nose".

As has already been mentioned previously, only the eye positions are relevant for the solution of the task in the categorizing task described here. In particular, the characteristic value D1 "eyes at low level" is linked to the category C1, and the characteristic value D2 "eyes at high level" is linked to the category C2. The characteristic values N1 and N2 relate however to a non-diagnostic characteristic without relevance during the determination of the category.

In the layer L1 of FIG. 2, the pools 120 and 110 further exist. The pool 120 describes a so-called non-specific neuron pool which represents all further exciting pulsed neurons in the layer L1. However, the pool 110 is a pool which represents the inhibiting pulsed neurons in this layer. Analogously, the layer L2 comprises a non-specific pool 220 for all further exciting pulsed neurons of the layer L2 and a pool 210 for all inhibiting neurons in this layer. The network structure described just now is based on the structure described in specification [3], which has already been used previously to explain different experimental paradigms (see also specification [1]).

In the embodiment of the invention described here, the model of spiking integrate and fire neurons (IF neurons) known sufficiently from the prior art is used as model for the description of the behavior of the neurons. In this model, an IF neuron integrates the afferent current which is generated by the voltage spikes impinging on the neuron, and the neuron fires voltage pulses when the depolarization of the cell membrane in the neuron exceeds a threshold. The model of a neuron is described by the following membrane potential V(t):

$$C_m \frac{dV(t)}{dt} = -g_m(V(t) - V_L) - I_{syn}(t) \quad (1)$$

$I_{syn}(t)$ is hereby the total incoming synaptic current, $C_m$ is the membrane capacity, $g_m$ is the membrane leakage conductivity and $V_L$ is the resting potential. A detailed description of the mathematical formulation of such IF neurons can, for example, be found in specification [3].

Each one of the layers L1 and L2 consists of a large number of IF neurons in the method described here. The layer L1 comprises $N_{E1}$=800 exciting neurons, which are divided into pools of $f \cdot N_{E1}$ neurons for every specific input pool and of $(1-4f) \cdot N_{E1}$ neurons for the non-specific pool. The layer L1 further comprises $N_{I1}$=200 inhibiting neurons, which forms the inhibiting pool in the layer. The second layer L2 comprises $N_{E2}$=520 exciting neurons, wherein $f \cdot N_{E2}$ neurons are provided for each category pool 201 and 202, and $(1-2f) \cdot N_{E2}$ neurons for the non-specific pool 220. The layer $N_{I2}$=130 further comprises inhibiting neurons in the inhibiting pool 210. The same ratio of neurons f=0.1 was chosen for all pools of exciting neurons due to simplicity. The ratio 80:20 of exciting neurons to inhibiting neurons was furthermore chosen, which corresponds to neurophysiological experimental data. During the execution of the method according to the invention, 1650 coupled differential equations (1) had to be solved. The numerical integration was carried out by using a Runge-Kutta method with a step size of 0.1 ms.

Every individual pool was driven by different inputs. All neurons in the modulated network first obtain a spontaneous background activity by $N_{ext}$=800 external exciting connections. Hereby, every connection carries a so-called Poisson-spike-train with a spontaneous frequency rate of 3 Hz, which is a typical value which is observed in the cerebral cortex. This leads to an external background input with a rate of 2.4 kHz for every neuron. The neurons in the pools 101 to 104 further receive additional external inputs which code the special stimulus. These inputs are shown in FIG. 2 in an exemplary manner as I, where, in the situation of FIG. 2, a stimulus of a face is entered which comprises a high eye position (input into the pool 101) and a long nose (input into the pool 103). It is assumed that the stimuli have their origin in the deeper regions of the brain, which process visual information so as to provide visual signals. It is assumed that, during the transmission of the visual signals, all characteristic values of the visual stimulus are processed and coded in the same manner, so that the so-called "bottom-up-signals" which reach the layer L1, code the present characteristic values of the stimulus on average with the same strength. When a pool of the ITC layer L1 is stimulated, the rate of the Poisson-train towards the neurons of this pool is increased by the fixed value $\lambda_{stim}$=150 Hz.

In the method described here, the conductivity values of the synapses between pairs of neurons are modulated by weights which can deviate from their standard value 1. The structure and the function of the network are achieved by different modeling of these weights within and between the neuron pools. Respectively forwardly-directed weights and backwardly-directed weights exist hereby between a pair of a first and a second neuron or between the corresponding neuron pools. A forwardly-directed weight is the weight of a synaptic connection from the first to the second neuron, and a backwardly-directed weight is the weight of the synaptic connection from the second to the first neuron. In FIG. 2, $w_1$ designates the strength of the weights of the connections between the pools 101 to 104, which are depicted by arcuate arrows, and also the weights between the neurons within the pools, which are respectively indicated by circular arrows directly at the pools. These weights $w_1$ in the layer L1 all have the same value. Analogously, $w_{-2}$ indicates the strength of the weights between the pools 201 and 202, and $w_{+2}$ relates to the strength of the weights of the neurons between the pools 201 and 202.

Furthermore, the following weights of connections between the layer L1 and L2 play a major role, wherein the corresponding connections (without description of the corresponding weights) are indicated by dashed double arrows in FIG. 2. The following definitions apply:

$w_{D2-C1}$, $w_{C1-D2}$: weights of the forwardly-directed or backwardly-directed synaptic connection between the pools 101 and 201;

$w_{D2-C2}$, $w_{C2-D2}$: weights of the forwardly-directed or backwardly-directed synaptic connection between the pools 101 and 202;

$w_{D1-C1}$, $w_{C1-D1}$: weights of the forwardly-directed or backwardly-directed synaptic connection between the pools 102 and 201;

$w_{D1-C2}$, $w_{C2-D1}$: weights of the forwardly-directed or backwardly-directed synaptic connection between the pools 102 and 202;

$w_{N1-C1}$, $w_{C1-N1}$: weights of the forwardly-directed or backwardly-directed synaptic connection between the pools 103 and 201;

$w_{N1-C2}$, $w_{C2-N1}$: weights of the forwardly-directed or backwardly-directed synaptic connection between the pools 103 and 202;

$w_{N2-C1}$, $w_{C1-N2}$: weights of the forwardly-directed or backwardly-directed synaptic connection between the pools 104 and 201;

$w_{N2-C2}$, $w_{C2-N2}$: weights of the forwardly-directed or backwardly-directed synaptic connection between the pools 104 and 202.

The network is structurally completely connected within the layers by exciting and inhibiting synapses. Between two layers, only neurons from the specific pools 101 to 104 and 201, 202 are completely connected to one another by exciting synapses.

It is assumed in the embodiment described here, that connections within the layers L1 and L2 are already formed, for example by self-organization mechanisms. The weights of the connections between and within the neuron pool 101, 102, 103 and 104 in the layer L1 are hereby set to the standard value $w_1=1$. It is assumed that the two actions "pull the lever to the left" and "pull the lever to the right", which correspond to the categories C1 and C2 respectively, are already coded in the PFC layer L2, namely in such a manner that the monkey was already trained that it only receives a reward when pulling the lever in one of the directions when solving the task correctly. The pools which code these actions probably comprise a so-called anti-correlated activity in their behavior context, which leads to a connection strength below average between them. In the embodiment described here, the extreme case $w_{-2}=0$ is assumed, that is, no direct exciting connection exists between the two category pools in the layer L2. The connections are set to the standard value $w_{+2}=1$ within a category pool.

The weights of the non-specific neurons in the pools 120 and 220 comprise a value of $w_n=0.93$ for both layers L1 and L2 in the method described here. All connections from and to the inhibiting pools 110 and 210 and the connections within the pools 120, 110, 220 and 210 are set to the standard value $w=1$.

The connections between the ITC layer L1 and the PFC layer L2 are modeled as so-called plastic synapses. Their absolute strengths are learnt with a learning algorithm according to the invention, which can be called reward-oriented Hebb's learning. For the analysis of the behavior of the neural network, the so-called mean field model was used, which constitutes a widely used method to analyze the approximate behavior of a neural network at least for the stationary states (that is, without dynamic transitions). The method ensures that the dynamics of the network converges towards a stationary attractor, which corresponds to the asymptotic behavior of an asynchronously firing spiking network. The mean field approximation is, for example, described in specifications [3] and [4], the whole disclosure of which will be part of the contents of the present application by this reference. In the embodiment of the invention described here, the mean field analysis described in specification [3] is used.

In the method according to the invention explained here, the initial network structure described previously is learnt, so as to modify the weights within and between the neuron pools in such a manner that the experimental data of the experiment described in the specification [2] are reproduced correctly. The learning method is based on the Hebb's learning which is sufficiently known from the prior art. In this learning, a simultaneous activity of neurons connected to one another via a synaptic connection leads to a strengthening of this synaptic connection. In the learning method described here, a so-called reward-oriented Hebb's method is used, in which the manner in which a synaptic connection between two neurons is changed depends on the activity state of the neurons on one hand, and on whether a correct categorizing was carried out for the simulated experiment just viewed on the other hand, that is, whether the set task was solved correctly. If the task was solved correctly, a so-called reward signal is present, where the weights of the synaptic connections are changed in a different manner than if no reward signal is present.

In the method described here, an experiment is simulated by corresponding input information in the layer L1. The input information hereby leads to an activation of those pools which are assigned to the corresponding characteristic values of the input information. If an experiment leads to a correct categorization, that is, if a reward signal is present, the forwardly-directed and the backwardly-directed synaptic connection between a first presynaptic neuron from one of the layers L1 and L2 and a second postsynaptic neuron from the other one of the layers L1 and L2 is strengthened if both neurons are active. In contrast, the forwardly-directed synaptic connection from an active presynaptic neuron from one of the layers L1 and L2 to an inactive postsynaptic neuron from the other one of the layers L1 and L2 is weakened. In all other cases of activity states, the synaptic connection is not changed.

In the case where an experiment does not lead to a reward signal, that is, when the neural network has not solved the categorizing task correctly, the forwardly-directed and the backwardly-directed connection between a first presynaptic neuron from one of the layers L1 and L2 and a second postsynaptic neuron from the other one of the layers L1 and L2 is weakened if both neurons are active. In all other cases, the synaptic connection is not changed.

Figure 3:
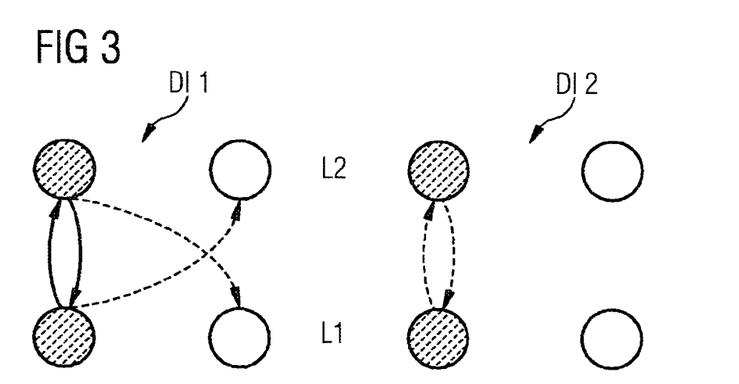
FIG. 3 shows a diagram for the clarification of the learning of a neuron with the method according to the invention.

FIG. 3 shows a diagram which again shows the procedure of the reward-oriented Hebb's learning used in the method according to the invention. The left diagram DI1 in FIG. 3 hereby shows the case of a reward signal, and the right diagram DI2 the case that no reward signal is present. In the two diagrams, active neurons are represented by hashed dots, and inactive neurons by white dots. The upper neurons in the diagrams are hereby neurons from the PFC layer L2 and the lower neurons are neurons from the ITC layer L1. The case of a strengthening of a synaptic connection is shown by solid arrows, and the case of a weakening of a synaptic connection is shown by dashed arrows. It can be seen that the forwardly- and backwardly-directed synaptic connections between two active neurons are strengthened in the reward case. In contrast, a forwardly-directed synaptic connection between a presynaptic active neuron and a postsynaptic inactive neuron is weakened. All other synaptic connections are not changed in the reward case. Without a reward signal, the forwardly- and backwardly-directed synaptic connections are weakened between two active neurons from different layers. All further synaptic connections between the neurons are not changed.

A stochastic synaptic model with binary states was used for carrying out the Hebb's learning method, as is for example described in specification [5]. The above-mentioned mean field approximation was used for evaluating the learning behavior.

The stimuli were randomly presented to the neural network in the embodiment of the method according to the invention described here. First, the internal variables of the network were put back, and then a spike dynamics was simulated for 500 ms of spontaneous activity, followed by 800 ms with the presence of input information representing a stimulus. For a period of time when the stimulus is presented to the neural network, the first 300 ms are viewed as transition time and only the last 500 ms are used to determine the time-averaged spiking rates for every simulated neuron.

For typical average fire rates in the simulations, the time slot of 500 ms for the estimation of these rates led to non-negligible fluctuations in the estimated values. Despite the full synaptic connectivity and the common value for the effectiveness of the synaptic connections in each pool, this led to a broad distribution of the estimated fire rates in the different pools for every experiment. This has non-trivial consequences during the learning based on the mean field approximation. In particular, undesired strengthenings or weakenings can occur between different pairs of pulse which led to a wrong use of the Hebb's learning method explained above. Nevertheless, the parameters of the above method were not changed to show the robustness of the model in view of effects which would influence the dynamics of the model in the case of fewer restrictions.

In every learning step of the embodiment described here, the part of the active neurons $n^a_i$ was calculated in every pool i, namely by the comparison of the previously calculated time-averaged spiking rate of every neuron within this pool with a given threshold. With a spiking rate of above 8 Hz for the layer L1 and a spiking rate of 14 Hz for the layer L2, a neuron was classified as active. If the pool which represents the correct category according to the set task comprises more than half of the neurons in the active state, and further if more than twice as many neurons are active in this pool than in the other category pool, a reward is assigned to this experiment, that is, a reward signal is set. If these conditions are not present, no reward is issued and no reward signal is present. Next, the part of the synaptic connections $N^P$ to be strengthened and the synaptic connections $N^d$ to be weakened as a result of the stimulus provided in the experiment is determined for every pair of specific pools from different layers.

In the case of a presynaptic pool with $n_{pre}$ neurons and $n^a_{pre}$ active neurons and a postsynaptic pool with $n_{post}$ neurons and $n^a_{post}$ active neurons, the following results:

In the case of a reward signal, all synaptic connections between pairs of active neurons are strengthened, and all forwardly-directed synaptic connections of an active neuron to an inactive neuron are weakened. The part of synaptic connections which are strengthened and weakened is as follows in the reward case:

$$N_{pre\text{-}post}^P = n_{pre}^a \cdot n_{post}^a / (n_{pre} \cdot n_{post}) \quad (2)$$

$$N_{pre\text{-}post}^d = n_{pre}^a \cdot (n_{post} - n_{post}^a) / (n_{pre} \cdot n_{post}) \quad (3)$$

In the case where no reward signal is present, all synaptic connections between pairs of active neurons are weakened, and no synaptic connections are strengthened. This can be expressed mathematically as follows:

$$N_{pre\text{-}post}^P = 0 \quad (4)$$

$$N_{pre\text{-}post}^d = n_{pre}^a \cdot n_{post}^a / (n_{pre} \cdot n_{post}) \quad (5)$$

In the following, the variable $C_{ij}$ is designated as the part of the strengthened synapses from one specific pool i in one layer to a specific pool j in another layer. This magnitude is updated as follows after every experiment which is carried out:

$$C_{ij}(t+1) = C_{ij}(t) + (1-C_{ij}(t))N_{ij}^P q_+ - C_{ij}(t)N_{ij}^d q_- \quad (6)$$

i and j indicate hereby the pre- or postsynaptic pool with (i;j) or (j;i)∈({D1,D2,N1,N2}, {C1,C2}); $q_+$ and $q_-$ are the transition probabilities for a strengthening or weakening. (1−$C_{ij}$(t)) and $C_{ij}$(t) are parts of weakened or strengthened synaptic connections and t is the number of the experiment. The equation (6) is valid at the presence and at the non-presence of a reward signal, but different values for $q_+$ and $q_-$ can also be used in the two cases. In the embodiment described here, the following is valid $q_+^{reward} = q_-^{reward} = 0.01$ and $q_-^{non\text{-}reward} = 0.05$.

The average modified synaptic weight between the layers L1 and L2 can then be calculated as follows for every pair of specific pools from different layers L1 and L2:

$$w_{ij} = w^+ C_{ij} + w^- (1-C_{ij}) \quad (7)$$

$w^+$ and $w^-$ are hereby the values which correspond to the connection strength between two pools, when all synaptic connections were strengthened or weakened. Different values for connections of layer L1 to layer L2 and from layer L2 to L1 can possibly be used.

As has already been explained above, the broad distribution of the fire rates can lead to undesirable displacements during the learning of the synaptic pool. Those effects where weights of non-diagnostic characteristics, which should fluctuate around their initial value in the ideal case, increase their activity and impede the learning process are very undesirable. Several regulation mechanisms can in principal be used for avoiding this effect. In the method described here, a normalization is used, with which the sum of all synaptic weights to a postsynaptic neuron is respectively kept constant.

A subtractive normalization of the total afferent synaptic connectivity was calculated across all presynaptic inputs reaching every given postsynaptic neuron. The average synaptic weight for all connections between a presynaptic pool i and a postsynaptic pool j is calculated as follows:

$$w_{ij}^{norm}(t) = w_{ij}(t) - \frac{1}{N}\left(\sum_{k=1}^{N} w_{kj}(t) - \sum_{k=1}^{N} w_{kj}(t-1)\right) \quad (8)$$

N is hereby the number of the presynaptic pools which are connected to the postsynaptic pool j. New values for the variables $C_{ij}$ are calculated based on the new values for $w_{ij}$ after the normalization, so that the equation (7) will continue to be valid. For the next presentation of a stimulus during the learning process, all synaptic connections between two pools from different layers L1 and L2 are set to the calculated average values $w_{ij}$.

In the following it will be explained which parameter values for $w^+$ and $w^-$ were used for strengthening or weakening the synaptic connection in the embodiment of the method according to the invention described here. So as to ensure the stability of the neural network, the connection weights between the two layers L1 and L2 were chosen to be not too small, so that an information exchange between the two layers is possible. However, the weights were also not chosen excessively high, so that the neural network does not strengthen excessively, whereby the neurons would lose their selectivity. Furthermore, biological restrictions for achieving realistic neural activities for the modulated neurons have to be considered.

For synaptic connections which connect two pools from layer L1 to layer L2, the values $w^+_{ff}=0.8$ and $w^-_{ff}=0$ were used for the strengthened or weakened state. For synaptic connections of pools of the layer L2 to layer L1, $w^+_{fb}=0.4$ and $w^-_{fb}=0$ were chosen as strengths for the strengthening or weakening of the synaptic connection. The strengthening of the connections from L1 to L2 was on average chosen twice as large as those of the connections from L2 to L1. This ratio accommodates the hypothesis that connections of L1 and L2 directed upwardly actuates the activity in higher cortical regions, while downwardly directed connections from L2 to L1 have a rather modular nature. The average synaptic strength between two pools between the layers L1 and L2 was set to $(w^++w^-)/2$. This value was kept constant during the learning method due to the subtractive normalization used.

The learning method was started with a balanced initial network, in which all connections between the two layers L1 and L2 were set to the following average synaptic strength: $w_{ij}=0.4$ und $w_{ji}=0.2$ with (i;j)∈({D1,D2,N1,N2},{C1,C2}).

In the following, some results of the learning method of the embodiment described above are depicted by means of FIGS. 4 and 5.

Figure 4A:
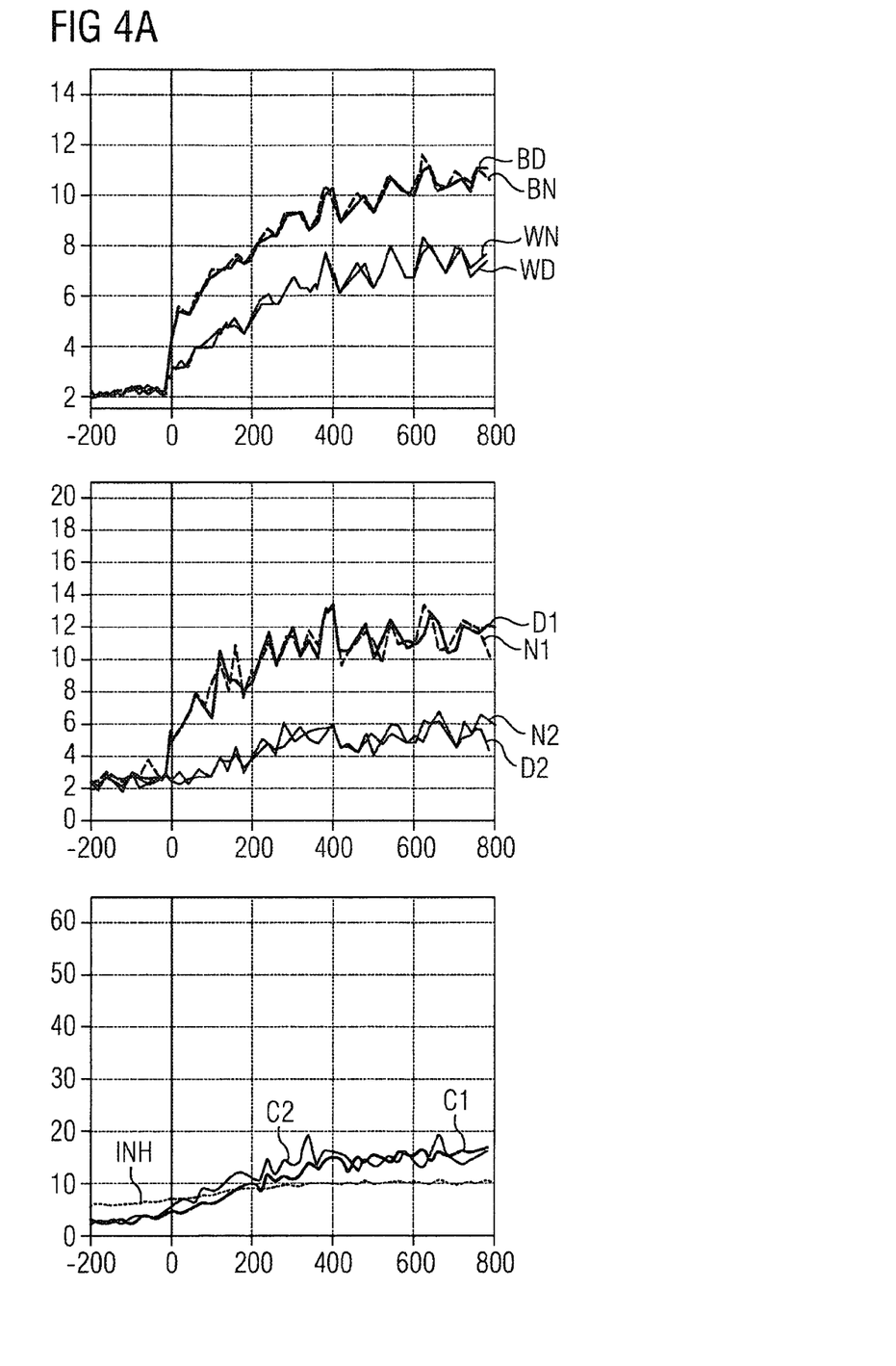
FIGS. 4A, 4B, and 4C show a diagram which represents the change of the activity of neurons in a neural network during the learning with the method according to the invention.
Figure 4B:
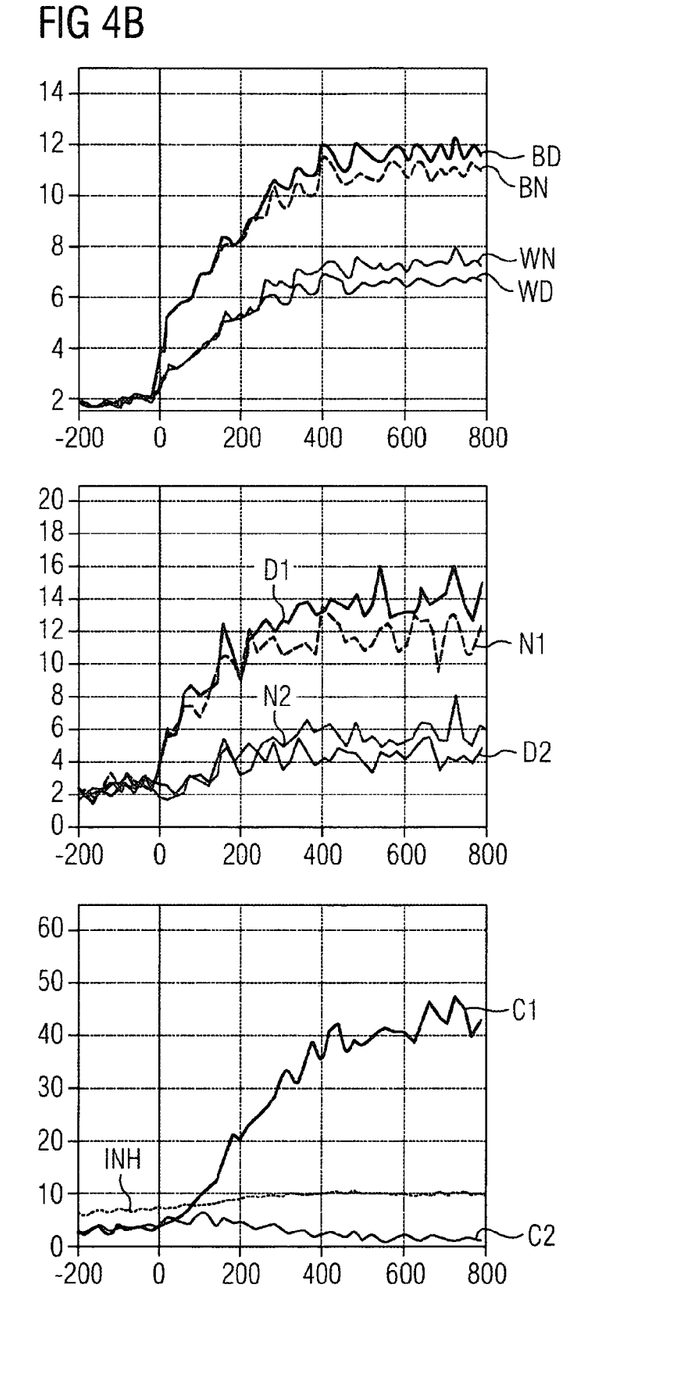
Figure 4C:
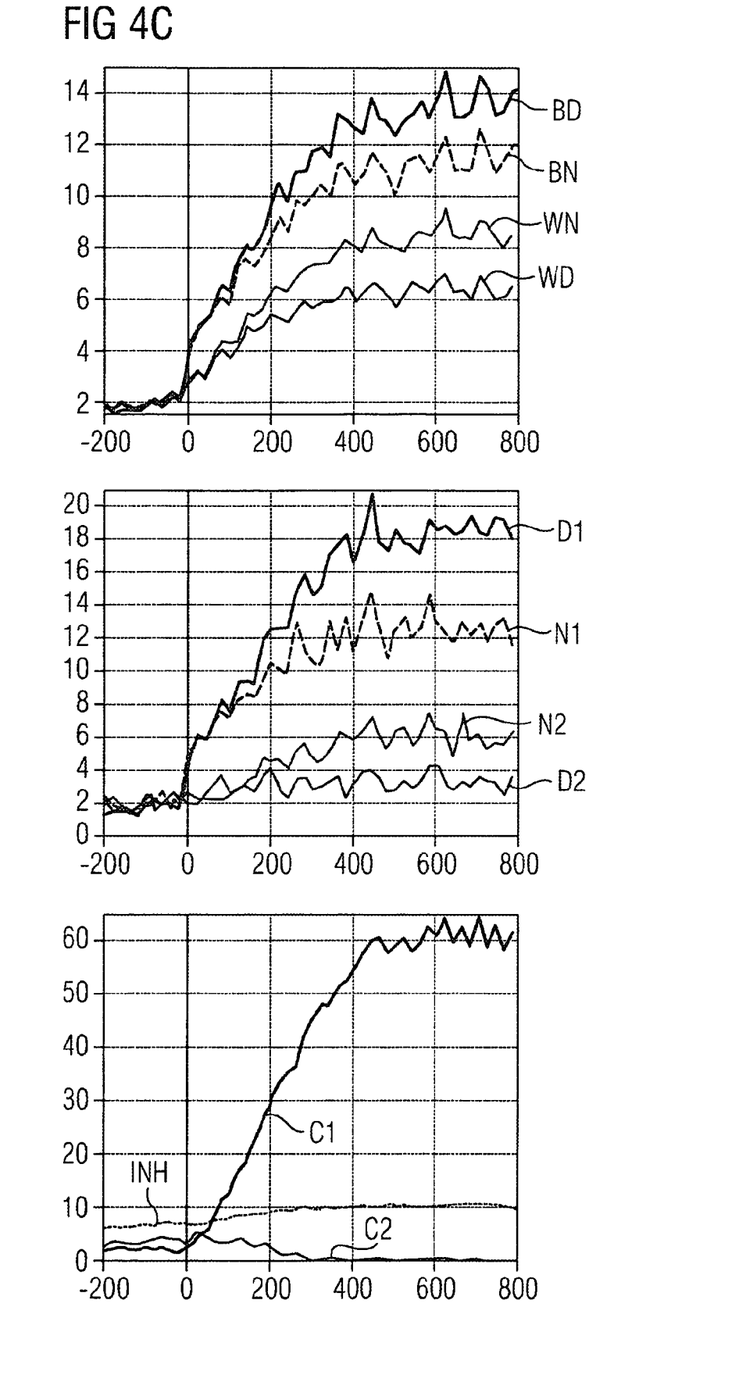

FIGS. 4A-4C show the simulation results of the method according to the invention for a neural network with spiking neurons, wherein the network was learnt with the method in 50 experiments and the network activities were averaged over these 50 experiments. In all diagrams in FIGS. 4A-4C, the time is plotted in milliseconds on the abscissa after the presentation of a stimulus, and the activity in Hz on the ordinate. FIG. 4A shows the activities of the network at the start of the learning, FIG. 4B shows the activities of the network after 200 learning steps, and FIG. 4C shows the activities of the network after 1500 learning steps, when a convergence of the synaptic parameters is reached.

The first row in FIGS. 4A-4C show the average spiking rate for neurons reacting on a stimulus. The following grouping was conducted hereby:

the strongest answers from all specific neurons of the L1 layer on the diagnostic characteristic from 50 experiments were averaged (line BD of FIGS. 4A-4C);

the weakest answers from all specific neurons of the L1 layer on the diagnostic characteristic from 50 experiments were averaged (line WD of FIGS. 4A-4C);

the strongest answers from all specific neurons of the L1 layer on the non-diagnostic characteristic from 50 experiments were averaged (line BN of FIGS. 4A-4C4);

the weakest answers from all specific neurons of the L1 layer on the non-diagnostic characteristic from 50 experiments were averaged (line WN of FIGS. 4A-4C).

The diagrams in the first row of FIGS. 4A-4C correspond to the calculations which were also carried out in the experiment from document [2].

The second and third row of FIGS. 4A-4C show the averaged spiking rates of the specific pool for those of the 50 experiments, where the characteristic values D1 ("eyes positioned low"), and N1 ("long nose") were presented. The curve D1 is hereby the spiking rate for the neuron pool 102, the curve D2 is the spiking rate for the neuron pool 101, the curve N1 is the spiking rate for the neuron pool 103, the curve N2 is the spiking rate for the neuron pool 104, the curve C1 is the spiking rate for the category pool 201, and the curve C2 is the spiking rate for the category pool 202. Furthermore, the spiking rate INH for the inhibiting pool 210 is shown in the third row of FIGS. 4A-4C.

It can be seen from all diagrams of FIGS. 4A-4C that a selection regarding the characteristic values and categories forms during the learning of the neural network, which is not present at the start of the learning. It can particularly be seen from the bottom row of FIGS. 4A-4C that a strong selectivity forms with regard to the activity of the category pools C1 and C2. As the category C1 represents the correct solution according to the presented stimulus, the activity of this neuron pool is very high, while the activity of category C2 falls to zero. The result of FIGS. 4A-4C corresponds to the experimental results from specification [2], so that a dynamic information selection for solving a categorizing task can be undertaken very well with the learnt neural network.

Figure 5A:
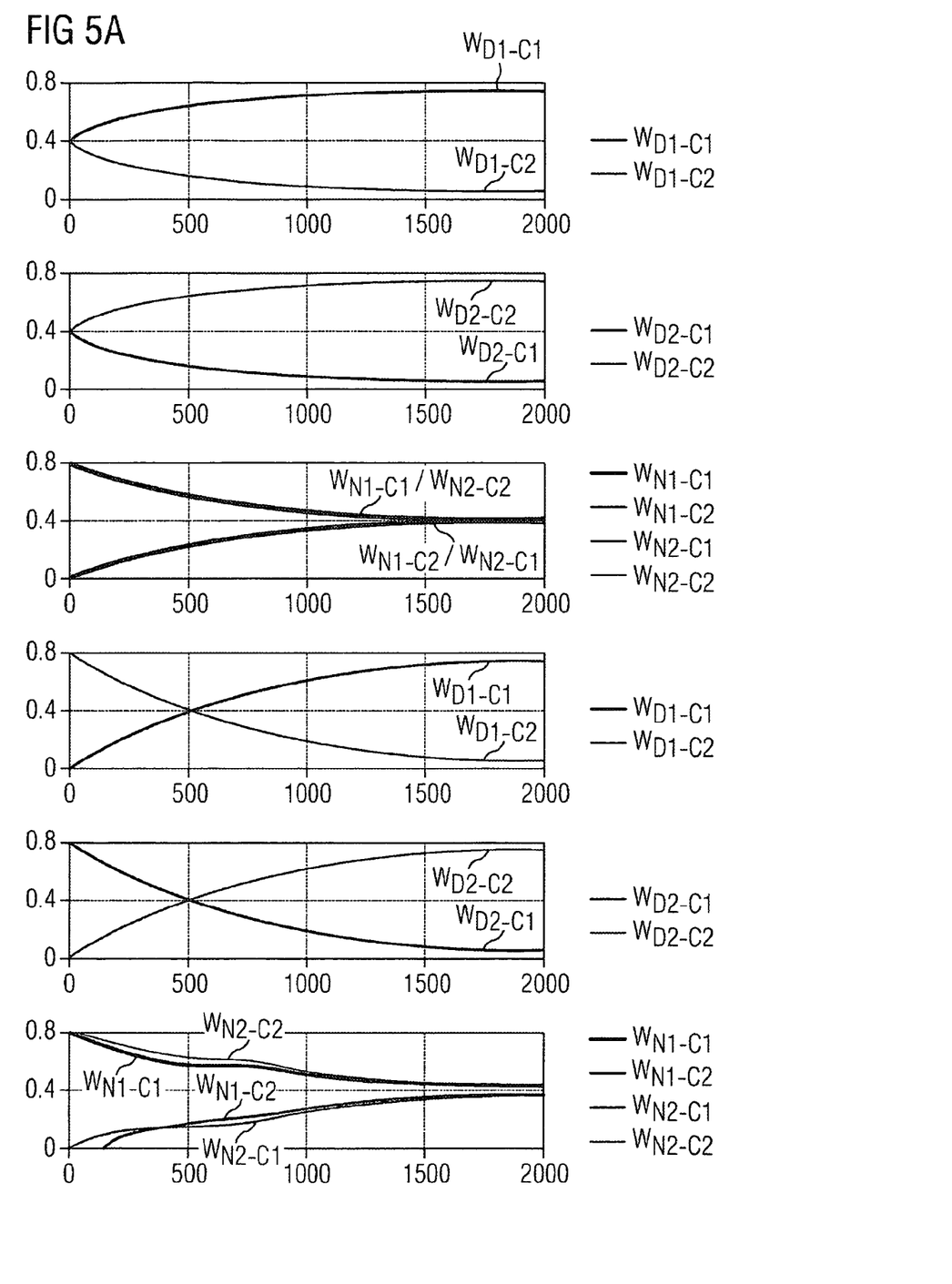
FIGS. 5A and 5B show a diagram which shows the change of the synaptic weights during the learning of different initial neural networks.
Figure 5B:
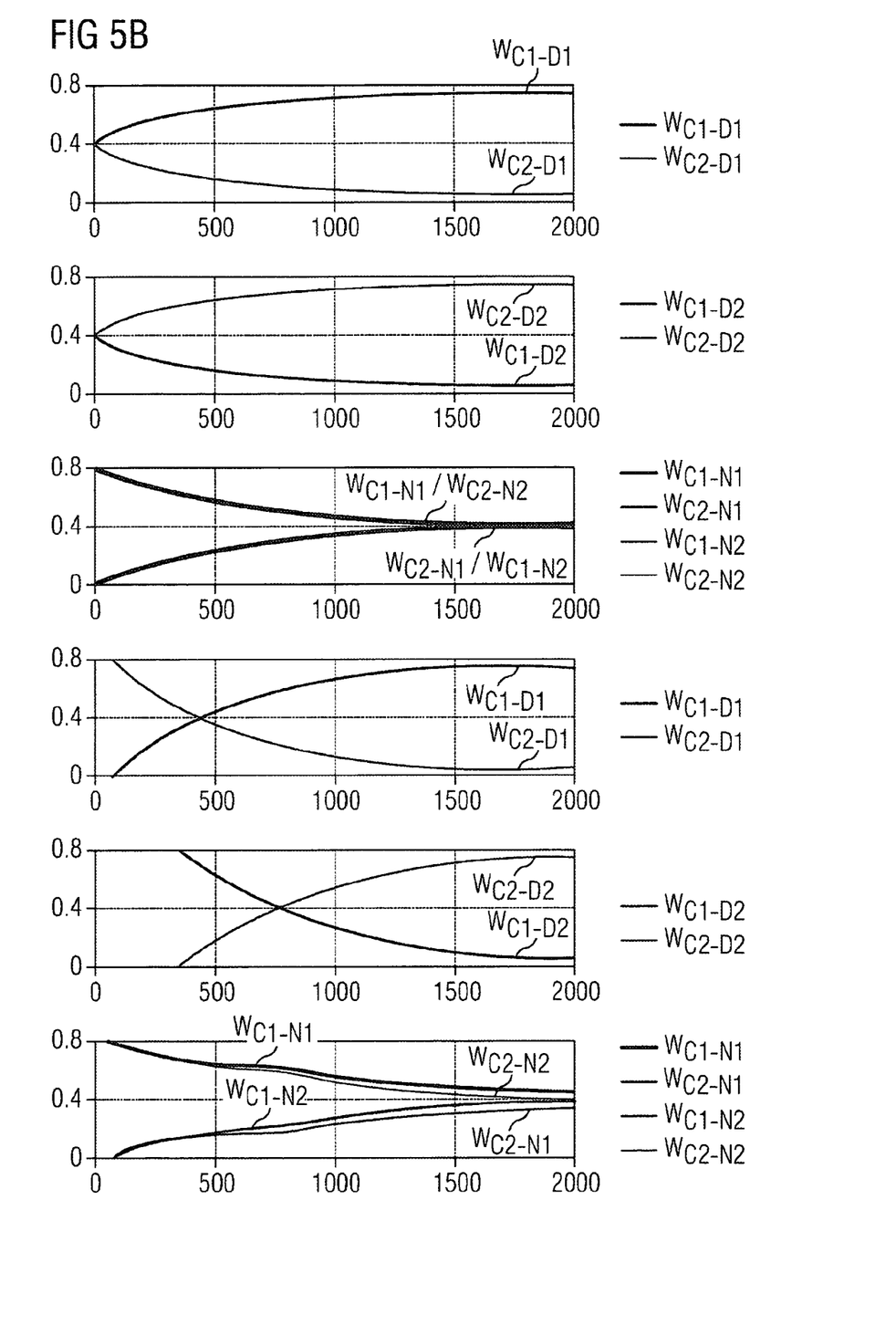

FIGS. 5A-5B show diagrams which reflect the weights of the synaptic connections (ordinates of the diagrams) as a function of the number of learning steps (abscissa of the diagrams) for different scenarios. Hereby, the weights $w_{D1-C1}$, $W_{D1-C2}$, $W_{D2-C1}$, $W_{D2-C2}$, $W_{N1-C1}$, $W_{N1-C2}$, $W_{N2-C1}$, $W_{N2-C2}$ defined above of the forwardly-directed synaptic connections and the corresponding weights of the backwardly-directed synaptic connections are considered. Further, two different initially initialized neural networks are differentiated. The upper three rows of FIGS. 5A-5B concern a starting network, which was previously adjusted to the non-diagnostic characteristic "nose length" as selective characteristic for determining the category. On the other hand, the starting network of the lower three rows of FIGS. 5A-5B was previously adjusted to the diagnostic characteristic "eye position", and also to the non-diagnostic characteristic "nose length" as selective characteristics for determining the category. As has been demonstrated previously, the learning of the network is however carried out in such a manner that only the characteristic "eye height" is a relevant characteristic for the solution of the task. It can clearly be seen from FIGS. 5A-5B that all forwardly- and backwardly-directed synaptic connections, which represent the correct categorizing of the diagnostic characteristic "eye height", are strengthened during the learning, while the connections which relate to the wrong categorization fall to zero. It can further be seen that all connections of and to non-diagnostic characteristics lose their selectivity and all run towards the same value.

Cited Literature

[1] Szabo, M., Almeida, R., Deco, G. and Stetter, M. (2004): "Cooperation and Biased Competition Model can explain Attentional Filtering in the Prefrontal Cortex", Eur. J. Neurosci., Vol. 9, p. 1669-1677

[2] Sigala, N. and Logothetis, N. (2002): "Visual Categorization shapes Feature Selectivity in the Primate Temporal Cortex", Nature 415: 318-320

[3] Brunel, N. and Wang, X. J. (2001): "Effects of Neuromodulation in a Cortical Network Model of Object Working Memory dominated by Recurrent Inhibition", Comput. Neurosci. 11: 63-85

[4] DE 10 2004 013924 B3

[5] Fusi, S., Annunziato, M., Badoni, D., Salamon, A. and Amit, D. (2000). "Spikedriven Synaptic Plasticity: Theory, Simulation, VLSI-implementation", Neural Comput. 12: 2227-2258

The invention claimed is:

1. A neural network for classification of input information to particular classes comprising a first layer of neurons representing characteristic values for the input information and a second layer of neurons representing categories for the input information, the layers crosslinked with synaptic connections comprising forwardly-directed and backwardly-directed synaptic connections having assigned weights, wherein the neural network is trained using a reward based learning method that modifies the weights of the synaptic connections between neurons based on a categorization determination and an activity state determination of a neuron, such that:

a) when a correct categorization is determined, 1) for each forwardly-directed and backwardly-directed synaptic connection between neurons of the first layer and neurons of the second layer, wherein the activity state of the neurons for that synaptic connection have been determined both to be active, the weight of the synaptic connection is strengthened, and 2) for each forwardly-directed synaptic connection between neurons of the first layer and neurons of the second layer, wherein the activity state of the first neuron has been determined to be active and the activity state of the second neuron has been determined to be inactive for that synaptic connection, the weight of the synaptic connection is weakened, and b) when an incorrect categorization is determined, 1) for each forwardly-directed and backwardly-directed synaptic connection between neurons of the first layer and neurons of the second layer, wherein the activity state of the neurons for that synaptic connection have been determined both to be active, the weight of the synaptic connection is weakened.

2. A method for computer-aided learning of a neural network, comprising:
- dividing a plurality of neurons of a neural network into at least two layers, comprising a first layer and a second layer crosslinked with the first layer,
- wherein the crosslinking between the first layer and the second layer is represented by synaptic connections between the neurons,
- wherein a strength of the connection is reflected by a weight, and
- wherein the synaptic connections between a first neuron and a second neuron have a forwardly-directed connection from the first neuron to the second neuron and a backwardly-directed connection from the second neuron to the first neuron;
- representing input information in the first layer respectively by one or more characteristic values from one or a plurality of characteristics, wherein at least one of the characteristic values comprises one or more neurons of the first layer, and wherein a plurality of categories are stored in the second layer, wherein the categories have one or more neurons of the second layer;
- assigning at least one category in the second layer to the characteristic values of the input information in the first layer respectively for one or several pieces of input information;
- entering input information into the first layer;
- determining at least one state variable of the neural network subsequent to the entering of the input information into the first layer;
- comparing the determined state variable of the neural network with the at least one assigned category in the second layer to the characteristic values of the input information in the first layer, wherein it is determined in the comparison if a conformity is present for the input information between the at least one state variable of the neural network and the assigned at least one category of the input information;
- determining an activity state of the neurons in the neural network, wherein the neurons are determined to be active or inactive;
- modifying the weights of synaptic connections between neurons based on both a conformity determination and the activity state determination of a neuron such that:
  a) when a conformity is present for the input information between the at least one state variable of the neural network and the assigned at least one category of the input information:
     1) strengthening the weights of forwardly-directed and backwardly-directed synaptic connections between active neurons of the first layer and active neurons of the second layer; and
     2) weakening the weights of the forwardly-directed synaptic connections of first active neurons from one of the first and the second layers to second inactive neurons from the other one of the first and the second layers; and
  b) when a nonconformity is present for the input information between the at least one state variable of the neural network and the assigned at least one category of the input information:
     1) weakening weights of forwardly-directed and backwardly-directed synaptic connections between active neurons of the first layer and active neurons of the second layer.

3. The method as claimed in claim 2, wherein the categories of the second layer represent solutions of a task, wherein the solution of the task depends on the input information.

4. The method as claimed in claim 3, wherein the characteristics are divided into diagnostic characteristics relevant for the solution of the task, and into non-diagnostic characteristics not relevant for the solution of the task.

5. The method as claimed in claim 3, wherein every at least one category assigned of an input information represents a right solution of the task.

6. The method as claimed in claim 2, wherein a conformity between the at least one state variable of the neural network for an input information and the assigned at least one category of this input information is present, if the number of the active neurons which belong to the assigned at least one category of this input information exceeds a predetermined number as a function of the total number of the neurons in the assigned at least one category or the number of active neurons in other categories.

7. The method as claimed in claim 2, wherein when a conformity is present, the weights of all synaptic connections not strengthened or weakened, are not changed.

8. The method as claimed in claim 2, wherein when a conformity is not present the weights of all synaptic connections not weakened, are not changed.

9. The method as claimed in claim 2, wherein an evaluation of conformity and the assignment are carried out several times in an iterative manner.

10. The method as claimed in claim 9, wherein the iteration is terminated after reaching a convergence criterion.

11. The method as claimed in claim 9, wherein a noimalization of the crosslinking of the neural network is carried out after carrying out the determination of the activity of the neurons in the neural network, classifying the neurons as active or inactive as a function of their activity and configuring the weights.

12. The method as claimed in claim 10, wherein a normalization of the crosslinking of the neural network is carried out after carrying out the determination of the activity of the neurons in the neural network, classifying the neurons as active or inactive as a function of their activity and configuring the weights.

13. The method as claimed in claim 2, wherein the crosslinked neurons of the first and second layer of the neural network are exciting pulsed neurons.

14. The method as claimed in claim 13, wherein the exciting pulsed neurons of the first layer are grouped at least partially into input pools, wherein at least one input pool is assigned to every characteristic value.

15. The method as claimed in claim 14, wherein the input pools cooperate with one another.

16. The method as claimed in claim 14, wherein activities of the input pool in each case represent a characteristic value.

17. The method as claimed in claim 13, wherein the exciting pulsed neurons of the second layer are grouped at least partially into category pools, wherein at least one category pool is assigned to every category.

18. The method as claimed in claim 17, wherein the category pools compete with one another, and wherein an active category pool prevails in the competition.

19. The method as claimed in claim 2, wherein the neural network contains inhibiting pulsed neurons, which form at least an inhibiting pool in the first or second layer, wherein the inhibiting pool exerts a global inhibition on the input or category pools.

20. A neural network, comprising:
a first layer having a plurality of neurons;
a second layer having a plurality of neurons, wherein the first layer and the second layer are crosslinked,
- wherein the crosslinking between the first layer and the second layer is represented by synaptic connections between the neurons,
- wherein a strength of the connection is reflected by assigned weights of the synaptic connections, and wherein the synaptic connections between a first neuron and a second neuron have a forwardly-directed connection from the first neuron to the second neuron and a backwardly-directed connection from the second neuron to the first neuron; and wherein input information in the first layer is represented respectively by one or more characteristic values from one or a plurality of characteristics, wherein the characteristic value comprises one or more neurons of the first layer, and wherein a plurality of categories are stored in the second layer, wherein the category has one or more neurons of the second layer, wherein for one or several pieces of input information, respectively at least one category in the second layer is assigned to the characteristic values of the input information in the first layer, wherein as the input information is entered into the first layer and subsequently at least one state variable of the neural network is determined and compared to the at least one category of the input information assigned to, it is determined in comparison if a conformity is present for the input information between the at least one state variable of the neural network and the assigned at least one category of the input information, wherein activity states of the neurons in the neural network are determined such that the neurons are respectively determined to be active or inactive, and wherein the neural network undergoes a reward based learning that modifies the weights of synaptic connections between neurons based on both a conformity determination and the state determination of a neuron such that,
- a) in the case that a conformity is present,
  1) the weights of the forwardly-directed and backwardly-directed synaptic connections between active neurons of the first layer and active neurons of the second layer are strengthened,
  2) and the weights of the forwardly-directed synaptic connections of first active neurons from one of the first and the second layers to second inactive neurons from the other one of the first and the second layers are weakened, and
- b) in the case that a conformity is not present,
  1) the weights of the forwardly-directed and backwardly directed synaptic connections between active neurons of the first layer and active neurons of the second layer are weakened.

* * * * *